(12) United States Patent
Kesaraju et al.

(10) Patent No.: US 12,399,271 B2
(45) Date of Patent: Aug. 26, 2025

(54) RADAR-BASED TARGET TRACKER

(71) Applicant: Infineon Technologies AG, El Segundo, CA (US)

(72) Inventors: Saiveena Kesaraju, Mountain View, CA (US); Jagjit Singh Bal, Fremont, CA (US); Yue Sun, San Jose, CA (US)

(73) Assignee: Infineon Technologies AG, Neubiberg (DE)

( * ) Notice: Subject to any disclaimer, the term of this patent is extended or adjusted under 35 U.S.C. 154(b) by 305 days.

(21) Appl. No.: 17/869,572

(22) Filed: Jul. 20, 2022

(65) Prior Publication Data
US 2024/0027608 A1    Jan. 25, 2024

(51) Int. Cl.
*G01S 13/90* (2006.01)
*G01S 13/58* (2006.01)

(52) U.S. Cl.
CPC ........ *G01S 13/9047* (2019.05); *G01S 13/583* (2013.01)

(58) Field of Classification Search
CPC ...... G01S 7/415; G01S 7/2922; G01S 7/2927; G01S 7/354; G01S 7/411; G01S 7/414; G01S 13/5246; G01S 13/536; G01S 13/726; G01S 13/931
See application file for complete search history.

(56) References Cited

U.S. PATENT DOCUMENTS

| | | | |
|---|---|---|---|
| 4,241,347 A | 12/1980 | Albanese et al. | |
| 5,061,934 A * | 10/1991 | Brown | G01S 13/5244<br>342/162 |
| 6,147,572 A | 11/2000 | Kaminski et al. | |
| 6,414,631 B1 | 7/2002 | Fujimoto | |
| 6,636,174 B2 | 10/2003 | Arikan et al. | |
| 7,048,973 B2 | 5/2006 | Sakamoto et al. | |

(Continued)

FOREIGN PATENT DOCUMENTS

| | | |
|---|---|---|
| CN | 1463161 A | 12/2003 |
| CN | 1716695 A | 1/2006 |

(Continued)

OTHER PUBLICATIONS

Vinci, Gabor et al., "Microwave Interferometer Radar-Based Vital Sign Detection for Driver Monitoring Systems", IEEE MTT-S International Conference on Microwaves for Intelligent Mobility, Apr. 27-29, 2015, 4 pages.

(Continued)

*Primary Examiner* — Peter M Bythrow
(74) *Attorney, Agent, or Firm* — Slater Matsil, LLP (57) ABSTRACT

In an embodiment, a method includes: receiving a range-Doppler image (RDI) based on raw data from a radar sensor; performing moving target indication (MTI) filtering on the RDI to generate a first filtered radar image; performing constant false alarm rate (CFAR) detection on the first filtered radar image to generate a second filtered radar image; performing minimum variance distortionless response (MVDR) beamforming on the second filtered radar image to generate a range-angle image (RAI); performing CFAR detection on the RAI to generate a third filtered radar image; generating a point set based on the third filtered radar image; clustering targets of the point set; and tracking at least one of the clustered targets using a Kalman filter.

23 Claims, 8 Drawing Sheets

(56) References Cited

U.S. PATENT DOCUMENTS

| | | |
|---|---|---|
| 7,057,564 B2 | 6/2006 | Tsai et al. |
| 7,171,052 B2 | 1/2007 | Park |
| 7,317,417 B2 | 1/2008 | Arikan et al. |
| 7,596,241 B2 | 9/2009 | Rittscher et al. |
| 7,692,574 B2 | 4/2010 | Nakagawa |
| 7,873,326 B2 | 1/2011 | Sadr |
| 7,889,147 B2 | 2/2011 | Tam et al. |
| 8,228,382 B2 | 7/2012 | Pattikonda |
| 8,497,805 B2 | 7/2013 | Rofougaran et al. |
| 8,659,369 B2 | 2/2014 | Rofougaran et al. |
| 8,731,502 B2 | 5/2014 | Salle et al. |
| 8,836,596 B2 | 9/2014 | Richards et al. |
| 8,847,814 B2 | 9/2014 | Himmelstoss et al. |
| 8,860,532 B2 | 10/2014 | Gong et al. |
| 8,976,061 B2 | 3/2015 | Chowdhury |
| 9,172,132 B2 | 10/2015 | Kam et al. |
| 9,182,476 B2 | 11/2015 | Wintermantel |
| 9,202,105 B1 | 12/2015 | Wang et al. |
| 9,229,102 B1 | 1/2016 | Wright et al. |
| 9,413,079 B2 | 8/2016 | Kamgaing et al. |
| 9,495,600 B2 | 11/2016 | Heu et al. |
| 9,886,095 B2 | 2/2018 | Pothier |
| 9,935,065 B1 | 4/2018 | Baheti et al. |
| 10,795,012 B2 * | 10/2020 | Santra .................... G06V 40/23 |
| 11,327,167 B2 * | 5/2022 | Vaishnav ................ G01S 7/415 |
| 2003/0179127 A1 | 9/2003 | Wienand |
| 2004/0238857 A1 | 12/2004 | Beroz et al. |
| 2006/0001572 A1 | 1/2006 | Gaucher et al. |
| 2006/0049995 A1 | 3/2006 | Imaoka et al. |
| 2006/0067456 A1 | 3/2006 | Ku et al. |
| 2007/0210959 A1 | 9/2007 | Herd et al. |
| 2008/0106460 A1 | 5/2008 | Kurtz et al. |
| 2008/0238759 A1 | 10/2008 | Carocari et al. |
| 2008/0291115 A1 | 11/2008 | Doan et al. |
| 2008/0308917 A1 | 12/2008 | Pressel et al. |
| 2009/0073026 A1 | 3/2009 | Nakagawa |
| 2009/0085815 A1 | 4/2009 | Jakab et al. |
| 2009/0153428 A1 | 6/2009 | Rofougaran et al. |
| 2009/0315761 A1 | 12/2009 | Walter et al. |
| 2010/0207805 A1 | 8/2010 | Haworth |
| 2011/0299433 A1 | 12/2011 | Darabi et al. |
| 2012/0087230 A1 | 4/2012 | Guo et al. |
| 2012/0092284 A1 | 4/2012 | Rofougaran et al. |
| 2012/0116231 A1 | 5/2012 | Liao et al. |
| 2012/0195161 A1 | 8/2012 | Little et al. |
| 2012/0206339 A1 | 8/2012 | Dahl |
| 2012/0265486 A1 | 10/2012 | Klofer et al. |
| 2012/0268314 A1 | 10/2012 | Kuwahara et al. |
| 2012/0280900 A1 | 11/2012 | Wang et al. |
| 2013/0027240 A1 | 1/2013 | Chowdhury |
| 2013/0106673 A1 | 5/2013 | McCormack et al. |
| 2014/0028542 A1 | 1/2014 | Lovitt et al. |
| 2014/0070994 A1 | 3/2014 | Schmalenberg et al. |
| 2014/0145883 A1 | 5/2014 | Baks et al. |
| 2014/0324888 A1 | 10/2014 | Xie et al. |
| 2015/0109165 A1 * | 4/2015 | Holder .................. G01S 7/2922 |
| | | 342/159 |
| 2015/0181840 A1 | 7/2015 | Tupin, Jr. et al. |
| 2015/0185316 A1 | 7/2015 | Rao et al. |
| 2015/0212198 A1 | 7/2015 | Nishio et al. |
| 2015/0243575 A1 | 8/2015 | Strothmann et al. |
| 2015/0277569 A1 | 10/2015 | Sprenger et al. |
| 2015/0325925 A1 | 11/2015 | Kamgaing et al. |
| 2015/0346820 A1 | 12/2015 | Poupyrev et al. |
| 2015/0348821 A1 | 12/2015 | Wanaga et al. |
| 2015/0364816 A1 | 12/2015 | Murugan et al. |
| 2016/0018511 A1 | 1/2016 | Nayyar et al. |
| 2016/0041617 A1 | 2/2016 | Poupyrev |
| 2016/0041618 A1 | 2/2016 | Poupyrev |
| 2016/0061942 A1 | 3/2016 | Rao et al. |
| 2016/0061947 A1 | 3/2016 | Patole et al. |
| 2016/0098089 A1 | 4/2016 | Poupyrev |
| 2016/0103213 A1 | 4/2016 | Ikram et al. |
| 2016/0109566 A1 | 4/2016 | Liu et al. |
| 2016/0118353 A1 | 4/2016 | Ahrens et al. |
| 2016/0135655 A1 | 5/2016 | Ahn et al. |
| 2016/0146931 A1 | 5/2016 | Rao et al. |
| 2016/0146933 A1 | 5/2016 | Rao et al. |
| 2016/0178730 A1 | 6/2016 | Trotta et al. |
| 2016/0187462 A1 | 6/2016 | Altus et al. |
| 2016/0191232 A1 | 6/2016 | Subburaj et al. |
| 2016/0223651 A1 | 8/2016 | Kamo et al. |
| 2016/0240907 A1 | 8/2016 | Haroun |
| 2016/0249133 A1 | 8/2016 | Sorensen |
| 2016/0252607 A1 | 9/2016 | Saboo et al. |
| 2016/0259037 A1 | 9/2016 | Molchanov et al. |
| 2016/0266233 A1 | 9/2016 | Mansour |
| 2016/0269815 A1 | 9/2016 | Liao et al. |
| 2016/0291130 A1 | 10/2016 | Ginsburg et al. |
| 2016/0299215 A1 | 10/2016 | Dandu et al. |
| 2016/0306034 A1 | 10/2016 | Trotta et al. |
| 2016/0320852 A1 | 11/2016 | Poupyrev |
| 2016/0320853 A1 | 11/2016 | Lien et al. |
| 2016/0327633 A1 | 11/2016 | Kumar Y.B et al. |
| 2016/0334502 A1 | 11/2016 | Ali et al. |
| 2016/0349845 A1 | 12/2016 | Poupyrev et al. |
| 2017/0033062 A1 | 2/2017 | Liu et al. |
| 2017/0045607 A1 | 2/2017 | Bharadwaj et al. |
| 2017/0052618 A1 | 2/2017 | Lee et al. |
| 2017/0054449 A1 | 2/2017 | Mani et al. |
| 2017/0060254 A1 | 3/2017 | Molchanov et al. |
| 2017/0070952 A1 | 3/2017 | Balakrishnan et al. |
| 2017/0074974 A1 | 3/2017 | Rao et al. |
| 2017/0074980 A1 | 3/2017 | Adib et al. |
| 2017/0090014 A1 | 3/2017 | Subburaj et al. |
| 2017/0090015 A1 | 3/2017 | Breen et al. |
| 2017/0115377 A1 | 4/2017 | Giannini et al. |
| 2017/0131395 A1 | 5/2017 | Reynolds et al. |
| 2017/0139036 A1 | 5/2017 | Nayyar et al. |
| 2017/0141453 A1 | 5/2017 | Waelde et al. |
| 2017/0170947 A1 | 6/2017 | Yang |
| 2017/0176574 A1 | 6/2017 | Eswaran et al. |
| 2017/0192847 A1 | 7/2017 | Rao et al. |
| 2017/0201019 A1 | 7/2017 | Trotta |
| 2017/0212597 A1 | 7/2017 | Mishra |
| 2017/0364160 A1 | 12/2017 | Malysa et al. |
| 2018/0046255 A1 | 2/2018 | Rothera et al. |
| 2018/0071473 A1 | 3/2018 | Trotta et al. |
| 2018/0101239 A1 | 4/2018 | Yin et al. |
| 2021/0080557 A1 * | 3/2021 | Vaishnav ................ G01S 13/72 |
| 2021/0116540 A1 * | 4/2021 | Santra .................... G06V 40/23 |
| 2022/0155434 A1 * | 5/2022 | Santra .................... G01S 7/415 |
| 2022/0260702 A1 * | 8/2022 | Vaishnav ................ G01S 13/584 |
| 2022/0400235 A1 * | 12/2022 | Spurgat ................ H04N 9/3194 |
| 2022/0400446 A1 * | 12/2022 | Ng ......................... G01S 7/006 |
| 2023/0333207 A1 * | 10/2023 | Yu ........................ G01S 7/2927 |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| DE | 102008054570 A1 | 6/2010 |
| DE | 102011100907 A1 | 1/2012 |
| DE | 102011075725 A1 | 11/2012 |
| DE | 102014118063 A1 | 7/2015 |
| EP | 3812791 A1 | 4/2021 |
| EP | 4001960 A1 | 5/2022 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |

(56) References Cited

FOREIGN PATENT DOCUMENTS

| WO | 2007060069 A1 | 5/2007 |
|---|---|---|
| WO | 2013009473 A2 | 1/2013 |
| WO | 2016033361 A1 | 3/2016 |

OTHER PUBLICATIONS

Vinci, Gabor et al., "Six-Port Radar Sensor for Remote Respiration Rate and Heartbeat Vital-Sign Monitoring", IEEE Transactions on Microwave Theory and Techniques, vol. 61, No. 5, May 2013, pp. 2093-2100.
Wang, Fu-Kang et al., "Wrist Pulse Rate Monitor Using Self-Injection-Locked Radar Technology", Biosensors, MDPI, Oct. 26, 2016, 12 pages.
Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, 1974, pp. 18-34.
Will, Christoph et al., "Advanced Template Matching Algorithm for Instantaneous Heartbeat Detection using Continuous Wave Radar Systems", ResearchGate, May 2017, 5 pages.
Will, Christoph et al., "Human Target Detection, Tracking, and Classification Using 24-GHz FMCW Radar", IEEE Sensors Journal, vol. 19, No. 17, Sep. 1, 2019, pp. 7283-7299.
Will, Christoph et al., "Local Pulse Wave Detection using Continuous Wave Radar Systems", IEEE Journal of Electromagnetics, RF and Microwaves in Medicine and Biology, Oct. 25, 2017, 9 pages.
Will, Christoph et al., "Radar-Based Heart Sound Detection", Scientific Reports, www.nature.com/scientificreports, Jul. 26, 2018, 15 pages.
Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, Apr. 15, 2014, 11 pages.
Xia, Zhaoyang et al., "Time-Space Dimension Reduction of Millimeterm-Wave Radar Point-Clouds for Smart-Home Hand-Gesture Recognition", IEEE Sensors Journal, vol. 22, No. 5, Mar. 1, 2022, 13 pages.
Arsalan, M. et al., "Character Recognition in Air-Writing Based on Network of Radars for Human-Machine Interface," IEEE Sensors Journal, vol. 19, No. 19, Oct. 1, 2019, 10 pages.
"BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.
Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.
Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.
Chioukh, Lydia et al., "Noise and Sensitivity of Harmonic Radar Architecture for Remote Sensing and Detection of Vital Signs", IEEE Transactions on Microwave Theory and Techniques, vol. 62, No. 9, Sep. 2014, pp. 1847-1855.
Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.
Deacon, Peter et al., "Frequency Modulated Continuous Wave (FMCW) Radar," Design Team 6 Technical Lecture, Nov. 9, 2011, 27 pages.
Dham, Vivek "Programming Chirp Parameters in TI Radar Devices," Application Report SWRA553, Texas Instruments, May 2017, 15 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.
Gigie, Andrew et al., "Novel Approach for Vibration Detection Using Indented Radar", Progess in Electromagnetic Research C, vol. 87, pp. 147-162, Oct. 4, 2018.
Gouveia, Carolina et al., "A Review on Methods for Random Motion Detection and Compensation in Bio-Radar Systems", Sensors, MDPI, Jan. 31, 2019, 17 pages.
Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.
Gu, Changzhan et al., "Deep Neural Network based Body Movement Cancellation for Doppler Radar Vital Sign Detection", IEEE MTT-S International Wireless Symposium (IWS) May 19-22, 2019, 3 pages.
Gu, Changzhu "Short-Range Noncontact Sensors for Healthcare and Other Emerginng Applications: A Review", Sensors, MDPI, Jul. 26, 2016, 24 pages.
Gu, Changzhan et al., "From Tumor Targeting to Speed Monitoring", IEEE Microwave Magazine, ResearchGate, Jun. 2014, 11 pages.
Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.
Hagara, M. et al., "Fingertip Detection for Virtual Keyboard Based on Camera," 23th Conference Radioelektronika, Apr. 16-17, 2013, 5 pages.
Hu, Wei et al., "Noncontact Accurate Measurement of Cardiopulmonary Activity Using a Compact Quadrature Doppler Radar Sensor", IEEE Transactions on Biomedical Engineering, vol. 61, No. 3, Mar. 2014, pp. 725-735.
Hu, Y et al., "mmKey: Universal Virtual Keyboard Using a Single Millimeter-Wave Radio," IEEE Internet of Things Journal, vol. 9, No. 1, Jan. 1, 2022, 15 pages.
Immoreev, I. Ya. "Ultrawideband Radars: Features and Capabilities", Journal of Communications Technology and Electronics, ISSN: 1064-2269, vol. 54, No. 1, Feb. 8, 2009, pp. 1-26.
Inac, Ozgur et al., "A Phased Array RFIC with Built-In Self-Test Capabilities," IEEE Transactions on Microwave Theory and Techniques, vol. 60, No. 1, Jan. 2012, 10 pages.
Killedar, Abdulraheem "XWR1xxx Power Management Optimizations—Low Cost LC Filter Solution," Application Report SWRA577, Texas Instruments, Oct. 2017, 19 pages.
Kishore, N. et al., "Millimeter Wave Antenna for Intelligent Transportation Systems Application", Journal of Microwaves, Optoelectronics and Electromagnetic Applications, vol. 17, No. 1, Mar. 2018, pp. 171-178.
Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.
Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.
Li, Changzhi et al., "A Review on Recent Advances in Doppler Radar Sensors for Noncontact Healthcare Monitoring", IEEE Transactions on Microwave Theory and Techniques, vol. 61, No. 5, May 2013, pp. 2046-2060.
Li, Changzhi et al., "A Review on Recent Progress of Portable Short-Range Noncontact Microwave Radar Systems", IEEE Transactions on Microwave Theory and Techniques, vol. 65, No. 5, May 2017, pp. 1692-1706.
Li, Changzhi et al., "Random Body Movement Cancellation in Doppler Radar Vital Sign Detection", IEEE Transactions on Microwave Theory and Techniques, vol. 56, No. 12, Dec. 2008, pp. 3143-3152.
Li, Changzhi et al., "Robust Overnight Monitoring of Human Vital Signs by a Non-contact Respiration and Heartbeat Detector", IEEE (56) References Cited

OTHER PUBLICATIONS

Proceedings of the 28th EMBS Annual International Conference, FrA05.5, Aug. 30-Sep. 3, 2006, 4 pages.

Li, Changzhi "Vital-sign monitoring on the go", Sensors news and views, www.nature.com/naturelectronics, Nature Electronics, vol. 2, Jun. 2019, 2 pages.

Lim, Soo-Chul et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.

_IN, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Massagram, Wansuree et al., "Assessment of Heart Rate Variability and Respiratory Sinus Arrhythmia via Doppler Radar", IEEE Transactions on Microwave Theory and Techniques, vol. 57, No. 10, Oct. 2009, pp. 2542-2549.

Mercuri, Marco et al., "Vital-sign monitoring and spatial tracking of multiple people using a contactless radar-based sensor", Nature Electronics, vol. 2, Articles, https://doi.org/10.1038/s41928-019-0258-6, Jun. 2019, 13 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Mostov, K., et al., "Medical applications of shortwave FM radar: Remote monitoring of cardiac and respiratory motion", Am. Assoc. Phys. Med., 37(3), Mar. 2010, pp. 1332-1338.

Oguntala, G et al., "Indoor location identification technologies for real-time IoT-based applications: an inclusive survey", Elsevier Inc., http://hdl.handle.net/10454/16634, Oct. 2018, 21 pages.

Peng, Zhengyu et al., "A Portable FMCW Interferometry Radar with Programmable Low-IF Architecture for Localization, ISAR Imaging, and Vial Sign Tracking", IEEE Transactions on Microwave Theory and Techniques, Dec. 15, 2016, 11 pages.

Qadir, Shahida G., et al., "Focused ISAR Imaging of Rotating Target in Far-Field Compact Range Anechoic Chamber," 14th International Conference on Aerospace Sciences & Aviation Technology, ASAT-14-241-IP, May 24-26, 2011, 7 pages.

Richards, Mark A., "Fundamentals of Radar Signal Processing," McGraw Hill Electronic Engineering, ISBN: 0-07-144474-2, Jun. 2005, 93 pages.

Sakamoto, Takuya et al., "Feature-Based Correlation and Topological Similarity for Interbeat Interval Estimation Using Ultrawideband Radar", IEEE Transactions on Biomedical Engineering, vol. 63, No. 4, Apr. 2016, pp. 747-757.

Santra, Avik et al., "Short-range multi-mode continuous-wave radar for vital sign measurement and imaging", ResearchGate, Conference Paper, Apr. 2018, 6 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

Simon, W., et al., "Highly Integrated KA-Band Tx Frontend Module Including 8×8 Antenna Array," IMST GmbH, Germany, Asia Pacific Microwave Conference, Dec. 7-10, 2009, 63 pages.

Singh, Aditya et al., "Data-Based Quadrature Imbalance Compensation for a CW Doppler Radar System", https://www.researchgate.net/publication/258793573, IEEE Transactions on Microwave Theory and Techniques, Apr. 2013, 7 pages.

Su, X. et al., "Virtual Keyboard: A human-computer interaction device based on laser and image processing," The 5th Annual IEEE International Conference on Cyber Technology in Automation, Control and Intelligent Systems, Jun. 3-12, 2015, 5 pages.

Suleymanov, Suleyman, "Design and Implementation of an FMCW Radar Signal Processing Module for Automotive Applications," Master Thesis, University of Twente, Aug. 31, 2016, 64 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Thayaparan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

Tu, Jianxuan et al., "Fast Acquisition of Heart Rate in Noncontact Vital Sign Radar Measurement Using Time-Window-Variation Technique", IEEE Transactions on Instrumentation and Measurement, vol. 65, No. 1, Jan. 2016, pp. 112-122.

\* cited by examiner

RADAR-BASED TARGET TRACKER

TECHNICAL FIELD

The present disclosure relates generally to an electronic system and method, and, in particular embodiments, to a radar-based target tracker.

BACKGROUND

Applications in the millimeter-wave frequency regime have gained significant interest in the past few years due to the rapid advancement in low cost semiconductor technologies, such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at e.g., 24 GHz, 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal (also referred to as the echo), and determining a distance based on a time delay and/or frequency difference between the transmission and reception of the frequency modulated signal. Accordingly, some radar systems include a transmitting antenna for transmitting the radio-frequency (RF) signal, and a receiving antenna for receiving the reflected RF signal, as well as the associated RF circuits used to generate the transmitted signal and to receive the RF signal. In some radar systems, multiple antennas may be used to implement directional beams using phased array techniques. A multiple-input and multiple-output (MIMO) configuration with multiple chipsets can be used to perform coherent and non-coherent signal processing.

SUMMARY

In accordance with an embodiment, a method includes: receiving a range-Doppler image (RDI) based on raw data from a radar sensor; performing moving target indication (MTI) filtering on the RDI to generate a first filtered radar image; performing constant false alarm rate (CFAR) detection on the first filtered radar image to generate a second filtered radar image; performing minimum variance distortionless response (MVDR) beamforming on the second filtered radar image to generate a range-angle image (RAI); performing CFAR detection on the RAI to generate a third filtered radar image; generating a point set based on the third filtered radar image; clustering targets of the point set; and tracking at least one of the clustered targets using a Kalman filter.

In accordance with an embodiment, a millimeter-wave radar system includes: a millimeter-wave radar sensor configured to transmit radar signals and receive reflected radar signals; and a processing system configured to: generate a range-Doppler image (RDI) based on the reflected radar signals, perform moving target indication (MTI) filtering on the RDI to generate a first filtered radar image, perform constant false alarm rate (CFAR) detection on the first filtered radar image to generate a second filtered radar image, perform minimum variance distortionless response (MVDR) beamforming on the second filtered radar image to generate a range-angle image (RAI), perform CFAR detection on the RAI to generate a third filtered radar image, generate a point set based on the third filtered radar image, cluster targets of the point set, and track at least one of the clustered targets using a Kalman filter.

In accordance with an embodiment, a device includes: a millimeter-wave radar sensor configured to transmit radar signals and receive reflected radar signals; a communication device including a transmitter configured to radiate power with a first intensity; and a processing system configured to: generate a range-Doppler image (RDI) based on the reflected radar signals, perform moving target indication (MTI) filtering on the RDI to generate a first filtered radar image, perform constant false alarm rate (CFAR) detection on the first filtered radar image to generate a second filtered radar image, perform minimum variance distortionless response (MVDR) beamforming on the second filtered radar image to generate a range-angle image (RAI), perform CFAR detection on the RAI to generate a third filtered radar image, generate a point set based on the third filtered radar image, cluster targets of the point set, track at least one of the clustered targets, and when a first target of the tracked clustered targets is detected within a predetermined distance from the transmitter of the communication device, cause a reduction of the radiated power from the first intensity to a second intensity lower than the first intensity.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in specific contexts, e.g., a radar-based short-range target tracker, which may be used in applications such as safety-related applications and human machine interface (HMI). Some embodiments may be used in other applications.

In an embodiment of the present invention, a radar processing chain detects and tracks short-range targets. Static targets and clutter are removed by performing moving target indication (MTI) filtering on radar-Doppler images (RDIs). Constant false alarm rate (CFAR) is performed on the filtered RDIs before performing digital beamforming, which may advantageously reduce the computational complexity of the radar processing chain, which may allow for real-time operation.

Embodiments of the present invention may be used in safety applications, such as by automatically causing the reduction of radiated power by a radio communication transmitter when a human (or a portion of a human) is near the radio communication transmitter and/or by warning a user when the user is too close to a predetermined location. Embodiments of the present invention may also be used in HMI applications, such as for detecting the actuation of virtual buttons.

Figure 1:
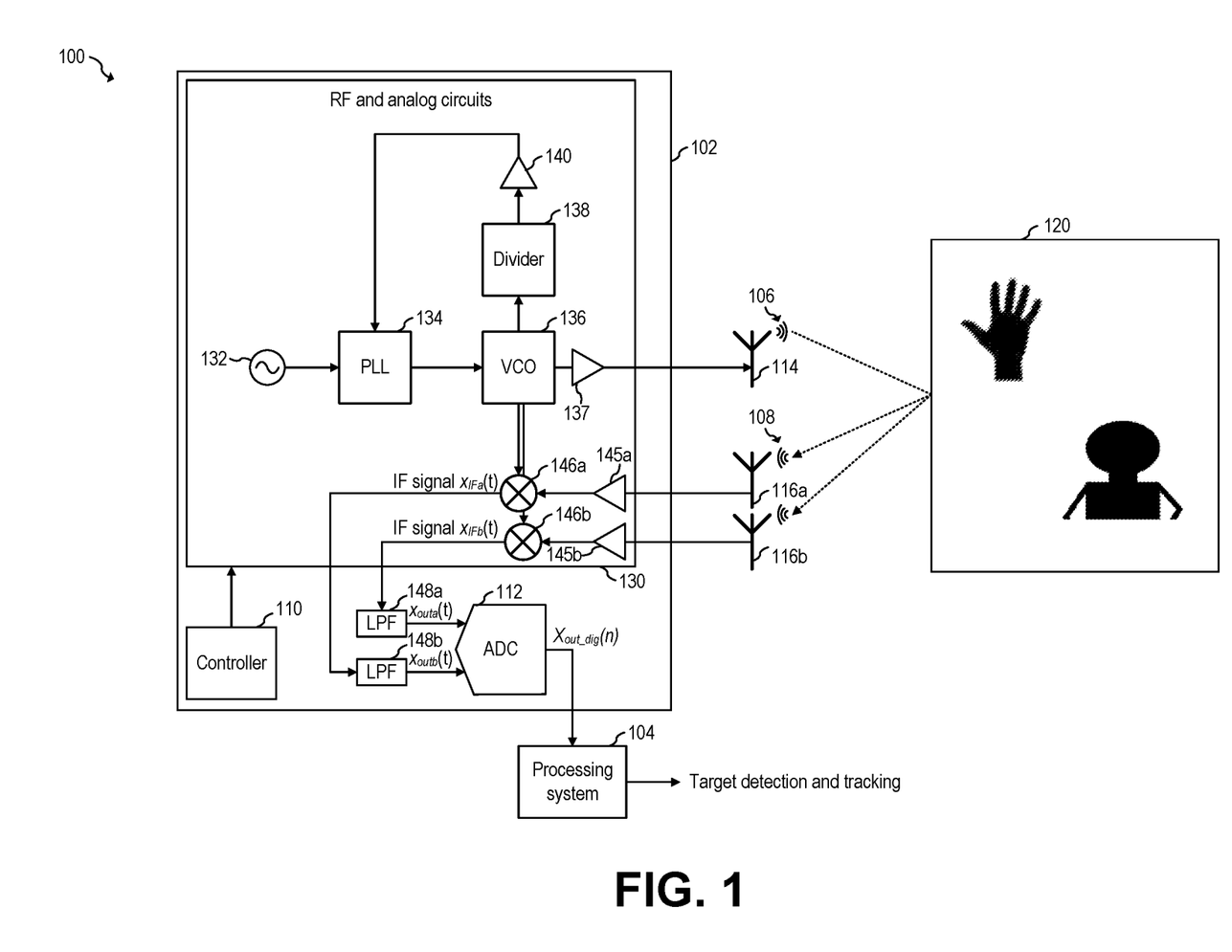
FIG. 1 shows a schematic diagram of a millimeter-wave radar system, according to an embodiment of the present invention.

A radar, such as a millimeter-wave radar, may be used to detect and track one or more (e.g., short-range) targets. For example, FIG. 1 shows a schematic diagram of millimeter-wave radar system 100, according to an embodiment of the present invention. Millimeter-wave radar system 100 includes millimeter-wave radar sensor 102 and processing system 104.

During normal operation, millimeter-wave radar sensor 102 operates as a frequency-modulated continuous-wave (FMCW) radar sensor and transmits a plurality of TX radar signals 106, such as chirps, towards scene 120 using one or more transmitter (TX) antenna 114. The radar signals 106 are generated using RF and analog circuits 130. The radar signals 106 may be, e.g., in the 20 GHz to 122 GHz range. Other frequencies may also be used.

In some embodiments, the field of view of millimeter-wave radar sensor 102 covering scene 120 has a short-range, such as below 1 meter, such as within 35 cm.

The objects in scene 120 may include one or more static or moving objects, such as a surface (e.g., table, countertop, etc.), a keyboard, a wall, and a portion of a human, such as a hand, head, or finger. Other objects may also be present in scene 120.

The radar signals 106 are reflected by objects in scene 120. The reflected radar signals 108, which are also referred to as the echo signal, are received by a plurality of receiving (RX) antennas. RF and analog circuits 130 processes the received reflected radar signals 108 using, e.g., band-pass filters (BPFs), low-pass filters (LPFs), mixers, low-noise amplifier (LNA), and/or intermediate frequency (IF) amplifiers in ways known in the art to generate an analog signal $x_{outa}(t)$ and $x_{outb}(t)$.

The analog signal $x_{outa}(t)$ and $x_{outb}(t)$ are converted to raw digital data $x_{out\_dig}(n)$ using analog-to-digital converter (ADC) 112. The raw digital data $x_{out\_dig}(n)$ is processed by processing system 104 to detect one or more targets and their position. In some embodiments, processing system 104 may also be used to track one or more targets in scene 120.

Although FIG. 1 illustrates a radar system with two receiver antennas 116 (antennas 116a and 116b), it is understood that more than two receiver antennas 116, such as three or more, may also be used. In some embodiments, using more receiver antennas 116 may result in higher spatial resolution.

Although FIG. 1 illustrates a radar system with a single transmitter antenna 114, it is understood that more than one transmitter antenna 114, such as two or more, may also be used.

Controller no controls one or more circuits of millimeter-wave radar sensor 102, such as RF and analog circuit 130 and/or ADC 112. Controller no may be implemented, e.g., as a custom digital or mixed signal circuit, for example. Controller no may also be implemented in other ways, such as using a general-purpose processor or controller, for example. In some embodiments, processing system 104 implements a portion or all of controller 110.

Processing system 104 may be implemented with a general-purpose processor, controller or digital signal processor (DSP) that includes, for example, combinatorial circuits coupled to a memory. In some embodiments, processing system 104 may be implemented as an application specific integrated circuit (ASIC). In some embodiments, processing system 104 may be implemented with an ARM, RISC, or x86 architecture, for example. In some embodiments, processing system 104 may include an artificial intelligence (AI) accelerator. Some embodiments may use a combination of hardware accelerator and software running on a DSP or general-purpose microcontroller. Other implementations are also possible.

In some embodiments, millimeter-wave radar sensor 102 and a portion or all of processing system 104 may be implemented inside the same integrated circuit (IC). For example, in some embodiments, millimeter-wave radar sensor 102 and a portion or all of processing system 104 may be implemented in respective semiconductor substrates that are integrated in the same package. In other embodiments, millimeter-wave radar sensor 102 and a portion or all of processing system 104 may be implemented in the same monolithic semiconductor substrate. In some embodiments, millimeter-wave radar sensor 102 and processing system 104 are implemented in respective integrated circuits. In some embodiments, a plurality of integrated circuits is used to implement millimeter-wave radar sensor 102. In some embodiments, a plurality of integrated circuits is used to implement processing system 104. Other implementations are also possible.

As a non-limiting example, RF and analog circuits 130 may be implemented, e.g., as shown in FIG. 1. During normal operation, voltage-controlled oscillator (VCO) 136 generates radar signals, such as a linear frequency chirps (e.g., from 57 GHz to 64 GHz, or from 76 GHz to 77 GHz), which are transmitted by transmitting antenna 114. The VCO 136 is controlled by PLL 134, which receives a reference clock signal (e.g., 80 MHz) from reference oscillator 132. PLL 134 is controlled by a loop that includes frequency divider 138 and amplifier 140. Amplifier 137 may be used to drive transmitting antenna 114.

The TX radar signals 106 transmitted by transmitting antenna 114 are reflected by objects in scene 120 and received by receiving antennas 116a and 116b. The echo received by receiving antennas 116a and 116b are mixed with a replica of the signal transmitted by transmitting antenna 114 using mixer 146a and 146b, respectively, to produce respective intermediate frequency (IF) signals $x_{IFa}$(t) $x_{IFb}$(t) (also known as beat signals). In some embodiments, the beat signals $x_{IFa}$(t) and $x_{IFb}$(t) have a bandwidth between 10 kHz and 1 MHz. Beat signals with a bandwidth lower than 10 kHz or higher than 1 MHz is also possible. Amplifiers 145a and 145b may be used to receive the reflected radar signals from antennas 116a and 116b, respectively.

Beat signals $x_{IFa}$(t) $x_{IFb}$(t) are filtered with respective low-pass filters (LPFs) 148a and 148b and then sampled by ADC 112. ADC 112 is advantageously capable of sampling the filtered beat signals $x_{outa}$(t) $x_{outb}$(t) with a sampling frequency that is much smaller than the frequency of the signal received by receiving antennas 116a and 116b. Using FMCW radars, therefore, advantageously allows for a compact and low cost implementation of ADC 112, in some embodiments.

The raw digital data $x_{out\_dig}$(n), which in some embodiments include the digitized version of the filtered beat signals $x_{outa}$(t) and $x_{outb}$(t), is (e.g., temporarily) stored, e.g., in matrices of $N_c \times N_s$ per receiving antenna 116, where $N_c$ is the number of chirps considered in a frame and $N_s$ is the number of transmit samples per chirp, for further processing by processing system 104.

In some embodiments, ADC 112 is a 12-bit ADC with multiple inputs. ADCs with higher resolution, such as 14-bits or higher, or with lower resolution, such as 10-bits, or lower, may also be used. In some embodiments, an ADC per receiver antenna may be used. Other implementations are also possible.

Figure 2:
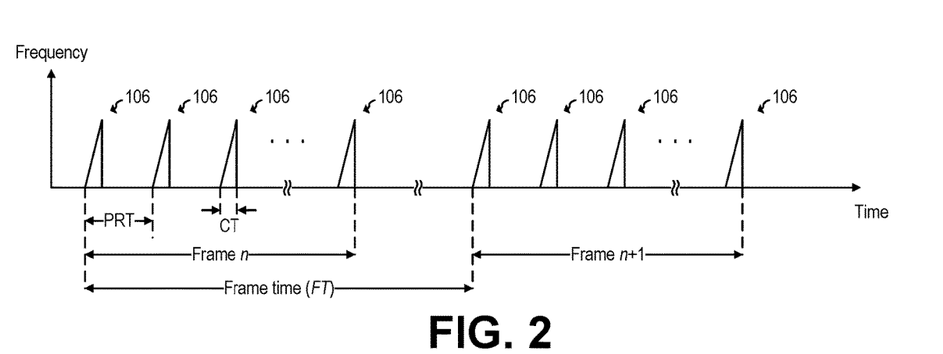
FIG. 2 shows a sequence of chirps transmitted by the transmitter antenna of FIG. 1, according to an embodiment of the present invention.

FIG. 2 shows a sequence of chirps 106 transmitted by TX antenna 114, according to an embodiment of the present invention. As shown by FIG. 2, chirps 106 are organized in a plurality of frames (also referred to as physical frames) and may be implemented as up-chirps. Some embodiments may use down-chirps or a combination of up-chirps and down-chirps, such as up-down chirps and down-up chirps. Other waveform shapes may also be used.

As shown in FIG. 2, each frame may include a plurality of chirps 106 (also referred to, generally, as pulses). For example, in some embodiments, the number of chirps in a frame is 64. Some embodiments may include more than 64 chirps per frame, such as 96 chirps, 128 chirps, 256 chirps, or more, or less than 64 chirps per frame, such as 32 chirps or less.

In some embodiments, frames are repeated every FT time. In some embodiments, FT time is 50 ms. A different FT time may also be used, such as more than 50 ms, such as 60 ms, 100 ms, 200 ms, or more, or less than 50 ms, such as 45 ms, 40 ms, or less.

In some embodiments, the FT time is selected such that the time between the beginning of the last chirp of frame n and the beginning of the first chirp of frame n+1 is equal to PRT. Other embodiments may use or result in a different timing.

The time between chirps of a frame is generally referred to as pulse repetition time (PRT). In some embodiments, the PRT is 5 ms. A different PRT may also be used, such as less than 5 ms, such as 4 ms, 2 ms, 0.5 ms, or less, or more than 5 ms, such as 6 ms, or more.

The duration of the chirp (from start to finish) is generally referred to as chirp time (CT). In some embodiments, the chirp time may be, e.g., 64 µs. Higher chirp times, such as 128 µs, or higher, may also be used. Lower chirp times, may also be used.

In some embodiments, the chirp bandwidth may be, e.g., 4 GHz. Higher bandwidth, such as 6 GHz or higher, or lower bandwidth, such as 2 GHz, 1 GHz, or lower, may also be possible.

In some embodiments, the sampling frequency of millimeter-wave radar sensor 102 may be, e.g., 1 MHz. Higher sampling frequencies, such as 2 MHz or higher, or lower sampling frequencies, such as 500 kHz or lower, may also be possible.

In some embodiments, the number of samples used to generate a chirp may be, e.g., 64 samples. A higher number of samples, such as 128 samples, or higher, or a lower number of samples, such as 32 samples or lower, may also be used.

Figure 3:
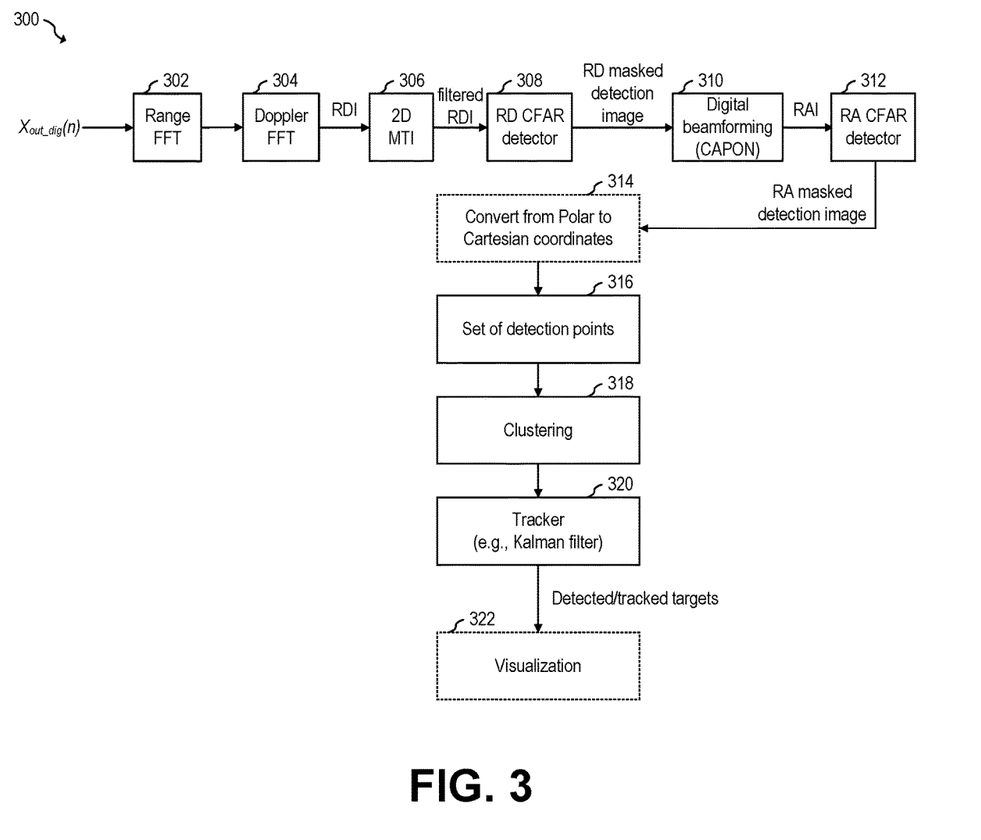
FIG. 3 shows a flow chart of an embodiment method for detecting and tracking short-range targets, according to an embodiment of the present invention.

FIG. 3 shows a flow chart of embodiment method 300 for detecting and tracking short-range targets, according to an embodiment of the present invention. Method 300 may be implemented by processing system 104.

During step 302, a range fast Fourier transform (FFT) is performed on the raw digital data $x_{out\_dig}$(n) (e.g., on data from each receiving channel, e.g., from each receiving antenna 116). For example, in some embodiments, a windowed FFT having a length of a chirp (e.g., 106) is calculated for each of a predetermined number of chirps (e.g., all chirps) in a frame. The result of the range FFT is an indication of energy distribution across ranges for each chirp.

During step 304, a Doppler FFT is performed on the out range FFT data (e.g., for each receiving antenna 116) generated during step 302. For example, in some embodiments, an FFT is calculated across each range bin over a number of consecutive periods to extract Doppler information. The result of step 304 are range Doppler maps (also known are range-Doppler images or RDIs) for each of the receiving channels (e.g., for each receiving antenna 116).

During step 306, two-dimensional (2D) moving target indication (MTI) filtering is applied to each RDI to generate first filtered images. In some embodiments, performing MTI filtering serves to discriminate a target against the clutter. For example, in some embodiments, after MTI filtering is performed on the RDIs, only targets with high motion are retained as their energy varies across Doppler images. Thus, in some embodiments, after 2D MTI filtering, a target (e.g., a hand) may be identifiable in the filtered RDIs while information about the background (e.g., keyboard, surface, etc.) may be partially or fully removed from the filtered RDIs. In some embodiments, the 2D MTI filter is implemented as a first order finite impulse response (FIR) filter.

During step 308, target detection is performed using constant false alarm rate (CFAR), such as ordered-statistic (OS) CFAR (OS-CFAR) on the filtered RDIs generated during step 306 to generated second filtered images (also referred to as RD masked detection images). During step 308, the CFAR detector generates a detection image in which, e.g., "ones" represent targets and "zeros" represent non-targets based on the power levels of the RDI when compared with a, e.g., predetermined threshold. The RD detection image operates as a mask and is multiplied by the original RDI (output of step 306) to obtain an RD masked image (at the output of step 308) in which only details of the detected targets are non-zero.

In some embodiments, detection of targets during step 308 is advantageously enabled by the relatively high signal-to-noise ratio (SNR) of moving targets due to the short-range field of view of millimeter-wave radar sensor 102.

In some embodiments, the performance of steps 306, 308 and 310 advantageously allows for the detection of macro-motions as well as micro-motions of targets while ignoring non-targets (e.g., background, e.g., static, clutter).

In some embodiments, performing target detecting on the RDIs before performing digital beamforming advantageously reduced computational complexity and allows for real-time operation.

During step 310, (e.g., 1D) digital beamforming (e.g., 1D Capon) is applied to estimate angle from the data across virtual channels from the antenna array configuration for each range that has passed step 308 to generate 2D range-angle image (RAI).

During step 312, target detection is performed using CFAR (e.g., OS-CFAR) on the RAI detection images generated during step 310 to generate third filtered images (also referred to as RA masked detection images). During step 312, the CFAR detector generates a detection image in which, e.g., "ones" represent targets and "zeros" represent non-targets based on the power levels of the RAI when compared with a, e.g., predetermined threshold. The RA detection image operates as a mask and is multiplied by the original RAI (output of step 310) to obtain an RA masked detection image (at the output of step 312) in which only details of the detected targets are non-zero.

During step 314, a conversion from Polar coordinates to Cartesian coordinates is performed. In some embodiments, step 314 is omitted.

During step 316, a set of detection points is generated. In some embodiments, each detection point includes: 2D coordinates, a signal strength value (indicative of the signal strength of target located at the 2D coordinates), and a Doppler value (indicative of the level of movement of the target at the 2D coordinates). In some embodiments, the 2D coordinates are Cartesian coordinates (e.g., x, y) (e.g., if step 314 is performed). In some embodiments, the 2D coordinates are Polar coordinates (e.g., range and angle) (e.g., if step 314 is not performed).

In some embodiments, such as in embodiments in which all receiving antennas are aligned in the same (e.g., horizontal) axis, each point of the set of detection points include 2D coordinates. In some embodiments, such as in embodiments in which the receiving antennas are arranged in an L shape, each point of the set of detection points include 3D coordinates.

During step 318, the points (targets) of the set of detection points are clustered, e.g., using a density-based spatial clustering of applications with noise (DBSCAN) algorithm to associate points (targets) to clusters. The output of DBSCAN is one or more groupings (clusters) of detected points, so that each grouping is associated with a respective target.

In some embodiments, each clustered target is represented as a single target having a point location, which may be the centroid of the cluster. For example, in some embodiments, a human hand may appear as a collection of targets before step 318. After step 318, a single point (e.g., corresponding to a geometric center of the hand) is used to represent the human hand.

In some embodiments, using Cartesian coordinates (e.g., by performing step 314) advantageously allows for an easier (e.g., less computationally expensive) implementation of the clustering step (318) since Cartesian coordinates are advantageously linear irrespective of the range. For example, in some embodiments, the same threshold (e.g., clustering points within 6 cm) may be performed to points near millimeter-wave radar sensor 102 and to points far from millimeter-wave radar sensor 102.

During step 320, the detected clusters are associated to respective tracks, e.g., using a probabilistic data association filter (PDAF) or nearest neighbor approach. In some embodiments, a (e.g., unscented) Kalman filter is used to filter and smoothen the tracks. In some embodiments, all features of the clusters (e.g., coordinates, signal strength value, and Doppler value) are tracked and filtered using the Kalman filter. In some embodiments, the Kalman filter may only track a subset of the features of the cluster (e.g., just the coordinates, such as (x,y)). The Kalman filter may be implemented in any way known in the art.

During step 322, visualization of the clusters (e.g., in a static manner, in real time, or over time) may be displayed, e.g., in a display.

Compared to camera-based target detection and tracking, target detection and tracking based on radar measurements can have some advantages such as: invariant to illumination conditions and preserving privacy.

Compared to Lidar-based solution target detection, target detection and tracking based on radar measurements can have some advantages such as being less expensive.

In some embodiments, method 300 may be performed to detect the presence of a human or a portion of human near a radiation source and reduce the power emitted by the radiation source in response to the detection of the presence of the human or portion of the human near the radiation source (e.g., to reduce or minimize the chance of injury to the human or portion of the human). For example, radiated power of a 5G NR transmitter may be focused on a narrow zone, which can cause health issues due to a high specific absorption rate (SAR) level. It may be desirable for communication devices, such as communication devices operating according to the 5G NR communication standard, to maintain the radiated power level low when a human or a portion of a human is near the radiation source to keep the SAR level below acceptable levels (which may be dictated by governmental organizations, such as the federal communication commission (FCC), and other global safety guidelines).

Figure 4:
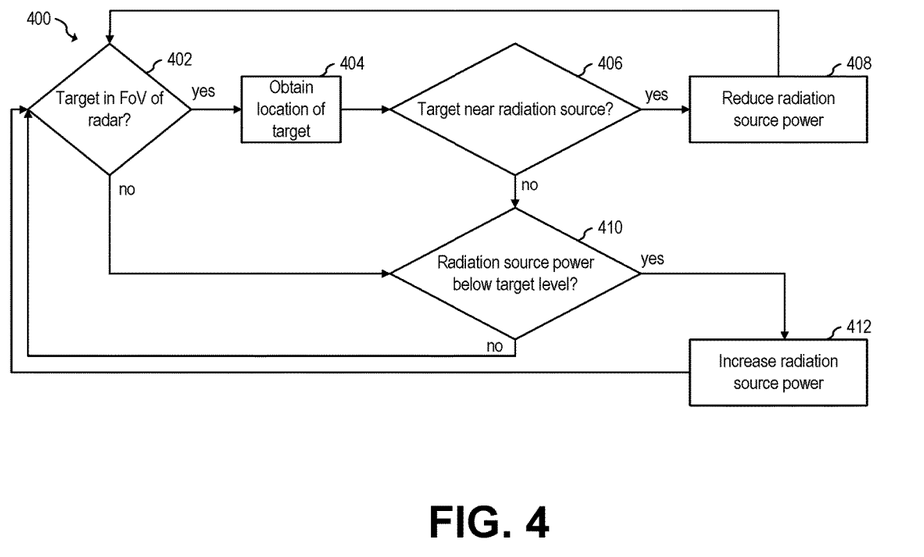
FIG. 4 shows a flow chart of an embodiment method for controlling the intensity of power radiated by a transmitter, according to an embodiment of the present invention.

FIG. 4 shows a flow chart of embodiment method 400 for controlling the intensity of power radiated by a transmitter, according to an embodiment of the present invention. Method 400 may be implemented by processing system 104.

During step 402, it is determined whether there is a target within the field of view (FoV) of millimeter-wave radar sensor 102. If a target is detected, step 404 is performed. If a target is not detected, step 410 is performed.

During step 404, the location of the detected target (e.g., a hand) is obtained, e.g., by performing method 300, with respect to the location of a radiation source. In some embodiments, the target location is obtained in Cartesian coordinates, which is advantageously linear with respect to the range from millimeter-wave radar sensor 102. In some embodiments, more than one target is detected during step 404.

During step 406, the distance between the location of each of the detected targets and the location of the source is determined. If the distance of at least one detected target is lower than a predetermined threshold (e.g., 6 cm), the power radiated by the radiation source is reduced during step 408. If the distance is larger than the predetermined threshold, step 410 is performed.

During step 410, the radiated power of the radiation source is compared with a target (e.g., optimum) level. If the radiation power is below the target level (e.g., due to a reduction because of the performance of step 408), the power radiated by the radiation source is increased (e.g., to the target level) during step 412.

Method 400 may be implemented in applications having at least one radio transmitter, such as an 4G LTE radio transmitter, 5G NR radio transmitter, or other types of communication transmitters. For example, in some embodiment, method 400 may be implemented by a mobile device, such as a laptop, smartphone, tablet, etc. In some embodiments, method 400 may be implemented by a non-mobile device, such as a smart thermostat, a smart TV, etc.

Figure 5A:
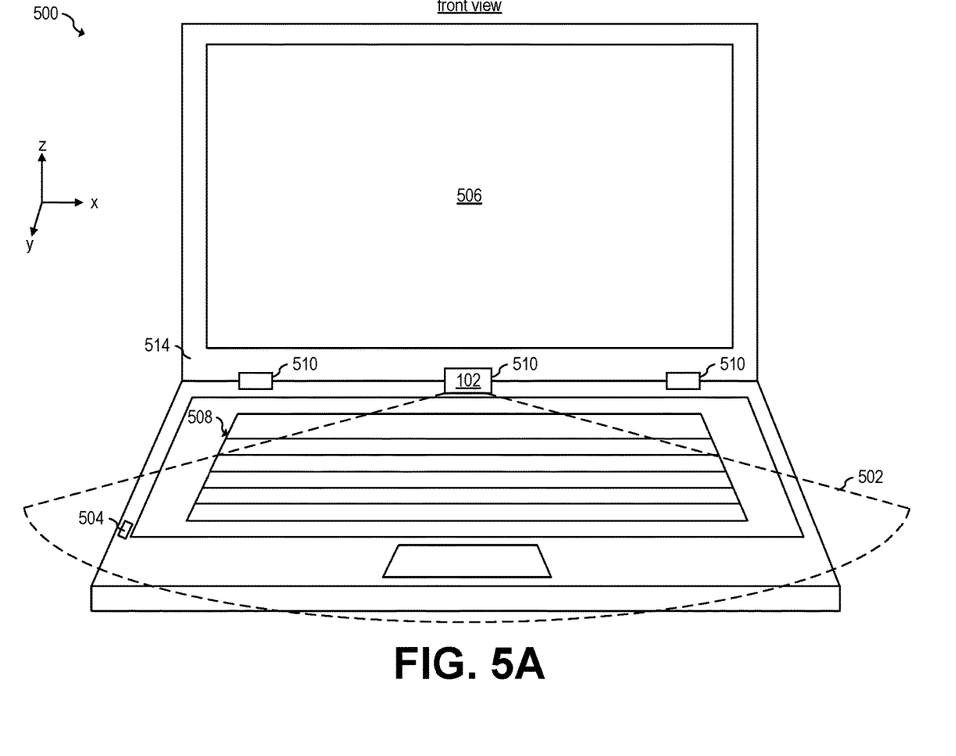
FIGS. 5A and 5B illustrate various views of a laptop, according to an embodiment of the present invention.
Figure 5B:
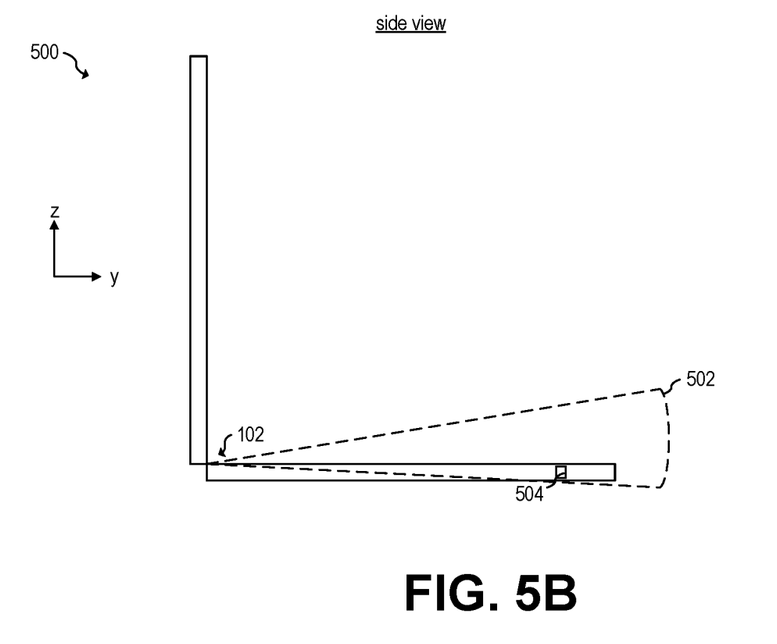

FIGS. 5A and 5B illustrate various views of laptop 500, according to an embodiment of the present invention. Laptop 500 includes millimeter-wave radar system 100, radio communication transmitter 504, display 506, bezel 514, keyboard 508, and hinges 510. As shown in FIGS. 5A and 5B, radio communication transmitter 504 is within the field of view 502 of millimeter-wave radar sensor 102.

During normal operation, laptop 500 may perform method 400 (e.g., using processing system 104). For example, when a target (e.g., a hand typing on keyboard 508) is detected near radio communication transmitter 504 (output of step 406=yes), the radiation power of radio communication transmitter 504 is reduced. By reducing the magnitude of power radiated by radio communication transmitter 504 when the target (e.g., the hand) is near radio communication transmitter 504, some embodiments advantageously may prevent or reduce the risk of injury to the target (e.g., the hand) due to high radiation while maintaining optimum communication quality via radio communication transmitter 504 when the target is near radio communication transmitter 504.

In some embodiments, radio communication transmitter 504 operates according to the 5G NR standard. In some embodiments, radio communication transmitter 504 operates according to a communication protocol different from 5G NR, such as 4G LTE, or future generations of communication protocols, for example.

In embodiments that include a plurality of radio communication transmitters 504, a corresponding step 406 may be performed for each detected target.

In some embodiments, such as in laptop 500, all operational receiver antennas 116 are arranged along the x axis, which allows for the identification of 2D coordinates (e.g., x,y) for each target during step 316. In some embodiments, some operational receiver antennas 116 are arranged along the x axis and some operational receiver antennas 116 are arranged along the z axis (such as 3 receiver antennas 116 arranged in L shape). Some such embodiments allow for the identification of 3D coordinates (e.g., x,y,z) for each target during step 316.

As shown in FIG. 5, laptop 500 may implement millimeter-wave radar sensor 102 attached or inside hinge 510. In some embodiments, other locations may be used, such as in bezel 514 (e.g., with field of view 502 designed to cover radio communication transmitter 504 during normal operation), for example.

Figure 6:
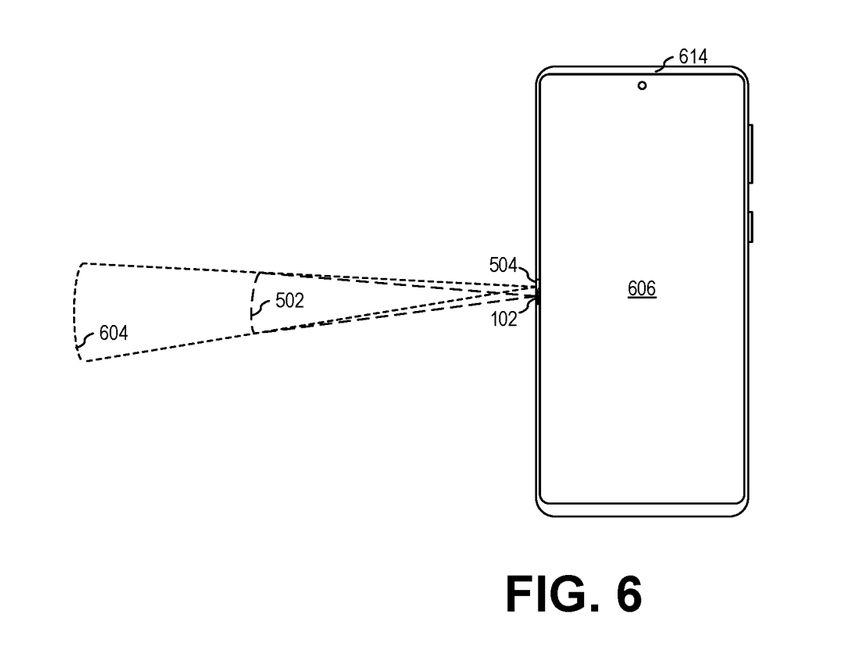
FIG. 6 illustrates mobile device 600, according to an embodiment of the present invention.

In some embodiments implementing method 400, millimeter-wave radar sensor 102 may be collocated in the same location as radio communication transmitter 504. For example, FIG. 6 illustrates mobile device 600, according to an embodiment of the present invention. Mobile device 600 includes display 606, bezel 614, millimeter-wave radar system 100, and radio communication transmitter 504.

As shown in FIG. 6, radio communication transmitter 504 and millimeter-wave radar sensor 102 are collocated in the same location in bezel 614. As also shown in FIG. 6, field of view 604 of radiation power of radio communication transmitter 504 (e.g., substantially) overlaps with field of view 502 of millimeter-wave radar sensor 102 in the short-range region (and may have substantially identical angle).

During normal operation, mobile device 600 may perform method 400 (e.g., using processing system 104). For example, since fields of view 502 and 604 (e.g., substantially) overlap in the short range (e.g., at a range equal to the predetermined range, or lower), a target detected in field of view 502 near millimeter-wave radar sensor 102 (at short range) is also near radio communication transmitter 504. Thus, in some embodiments, when a target (e.g., a hand) is detected in the field of view 502 at a range equal to a predetermined range or lower (output of step 406=yes), the radiation power of radio communication transmitter 504 is reduced. By reducing the magnitude of power radiated by radio communication transmitter 504 when the target (e.g., the hand) is near radio communication transmitter 504, some embodiments advantageously may prevent or reduce the risk of injury to the target (e.g., the hand) due to high radiation while maintaining optimum communication quality via radio communication transmitter 504 when the target is near radio communication transmitter 504.

In embodiments that include a plurality of radio communication transmitters 504, a corresponding plurality of millimeter-wave radar sensors 102 may be used to perform respective method 400.

Figure 7:
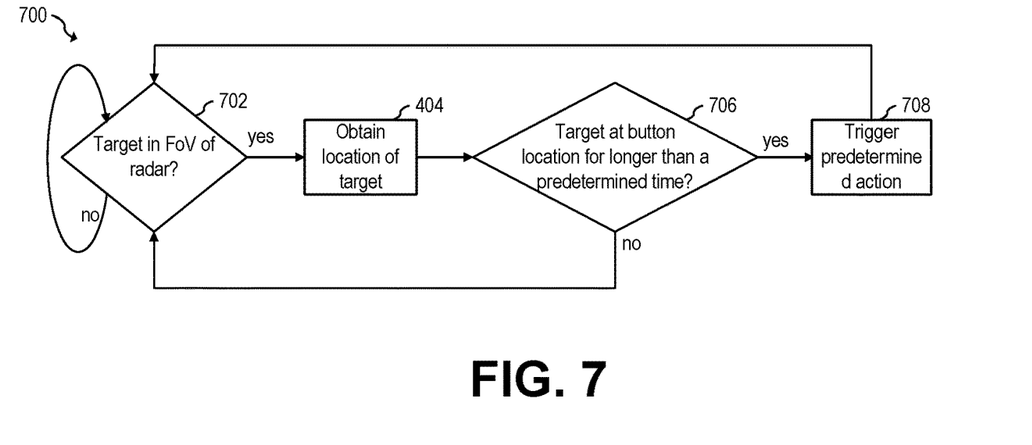
FIG. 7 shows a flow chart of an embodiment method for detecting the virtual actuation of a button and, in response, triggering a predetermined action, according to an embodiment of the present invention.

In some embodiments, method 300 may be used for human machine interface (HMI). For example, FIG. 7 shows a flow chart of embodiment method 700 for detecting the virtual actuation of a button and, in response, triggering a predetermined action, according to an embodiment of the present invention. Method 700 may be implemented by processing system 104.

Method 700 includes steps 702, 404, 706 and 708. Step 404 may be implemented in a similar manner as described with respect to FIG. 4.

During step 702, it is determined whether there is a target within the field of view (FoV) of millimeter-wave radar sensor 102, where the field of view of millimeter-wave radar sensor covers the location of a virtual button. If a target is detected, after obtaining the location of the target during step 404, the target location is compared with the location of the virtual button during step 706. If the target is at the location of the virtual button for longer than a predetermined time (e.g., 2 seconds), a predetermined action is triggered during step 708.

In some embodiments, the predetermined action triggered during step 708 includes turning on or off a device or function or changing a parameter of a device (e.g., volume, intensity, etc.), for example.

In embodiments having multiple virtual buttons, step 706 may be performed for the locations of each of the virtual buttons.

Figure 8A:
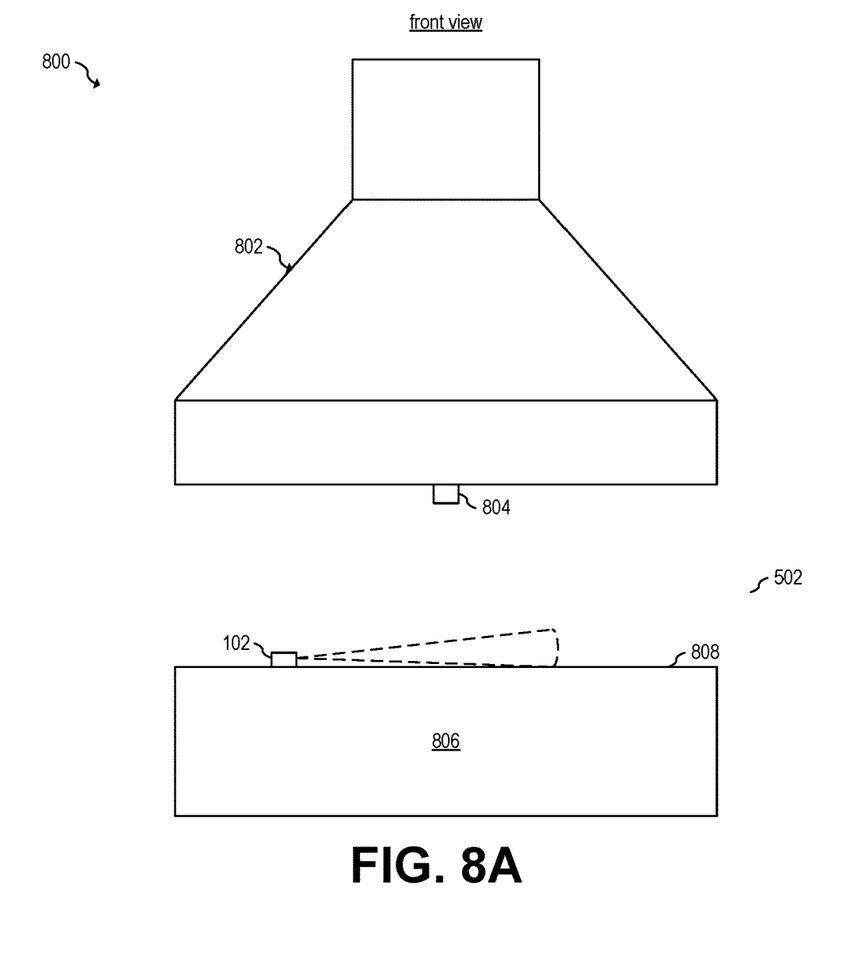
FIGS. 8A-8D illustrate various views of a cooking system, according to an embodiment of the present invention.
Figure 8B:
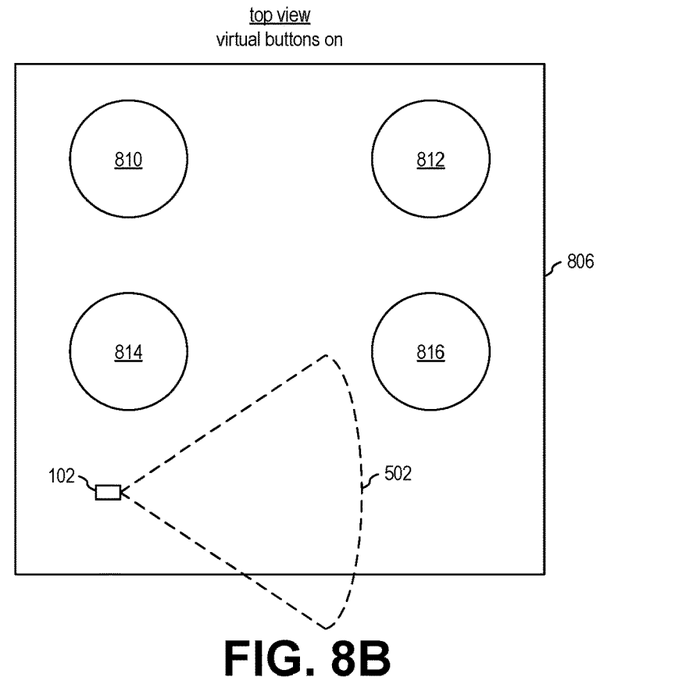

FIGS. 8A and 8B illustrate various views of cooking system 800, according to an embodiment of the present invention. Cooking system 800 includes hood 802, projector 804, and stove 806. Stove 806 includes top surface 808 and burners 810, 812, 814 and 816.

Figure 8C:
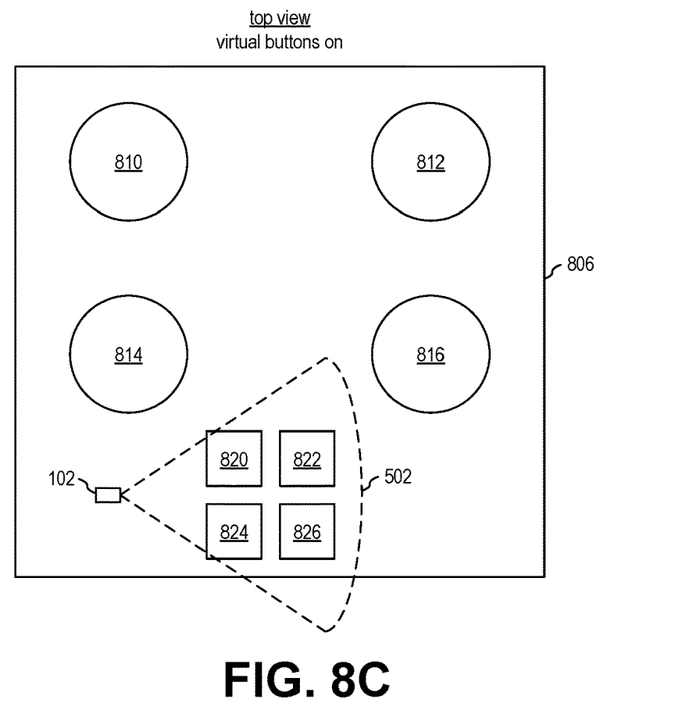
Figure 8D:
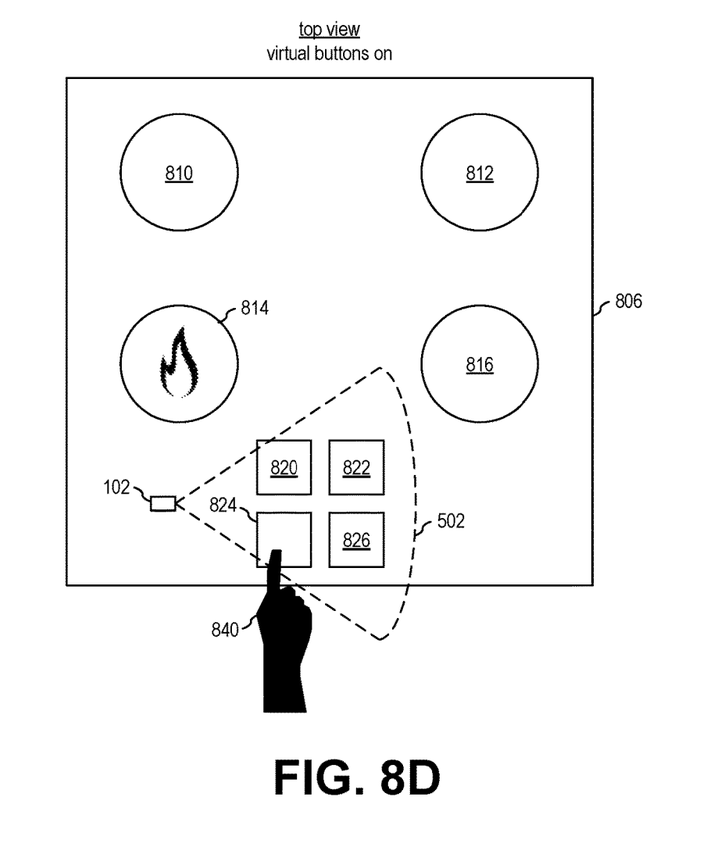

FIGS. 8C and 8D illustrate a top view of stove 806 during operation, according to an embodiment of the present invention.

As shown in FIGS. 8A and 8B, in an off mode of operation, virtual buttons are not displayed on top surface 808. As shown in FIGS. 8C and 8D, in an on mode of operation, projector 804 displays one or more buttons (e.g., 820, 822, 824, and 826) on top surface 808. During the on mode of operation, cooking system 800 may perform method 700 (e.g., using processing system 104). For example, as illustrated in FIG. 8D, when hand/finger 840 is detect over button 824 for longer than a predetermined time (output of step 706=yes), the corresponding burner 814 is turned on.

As shown in FIGS. 8A-8D, in some embodiments, millimeter-wave radar sensor 102 may be disposed on surface 808. In some embodiments, millimeter-wave radar sensor 102 may be disposed in other places, such as collocated with projector 804, for example.

Figure 9:
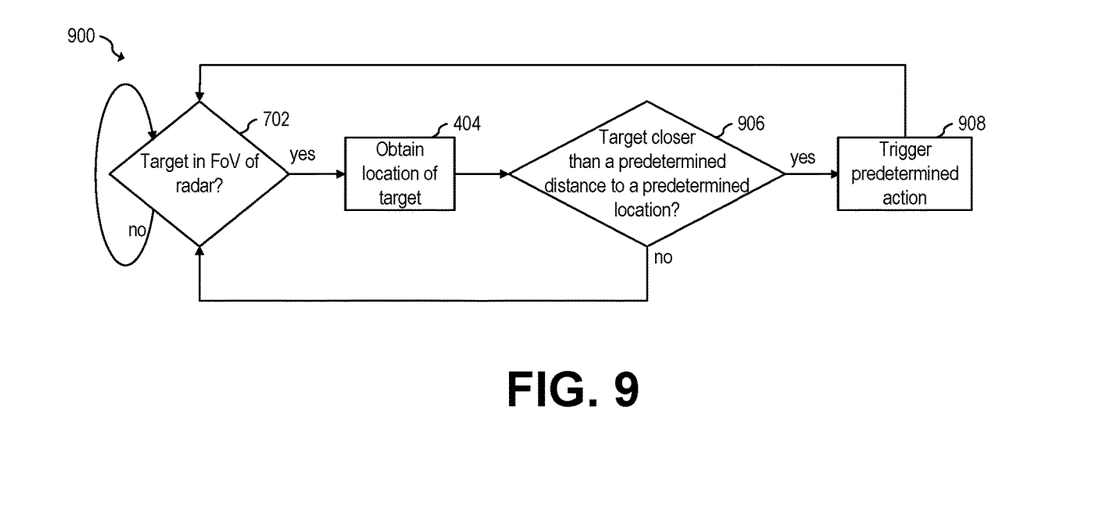
FIG. 9 shows a flow chart of an embodiment method for detecting the presence of a target near a predetermined location, according to an embodiment of the present invention.

In some embodiments, method 300 may be used to warn or take action when a target is too close to a predetermined location. For example, FIG. 9 shows a flow chart of embodiment method 900 for detecting the presence of a target near a predetermined location, according to an embodiment of the present invention. Method 900 may be implemented by processing system 104.

Method 900 includes steps 702, 404, 906 and 908. Step 404 may be implemented in a similar manner as described with respect to FIG. 4. Step 702 may be implemented in a similar manner as described with respect to FIG. 7.

If a target is detected during step 702, after obtaining the location of the target during step 404, the target location is compared with a predetermined location (e.g., the location of millimeter-wave radar sensor 102) during step 906. If the target closer than a predetermined distance to the predetermined location, a predetermined action (e.g., warn a user that it is too close to the predetermined location) is triggered during step 908.

Figure 10A:
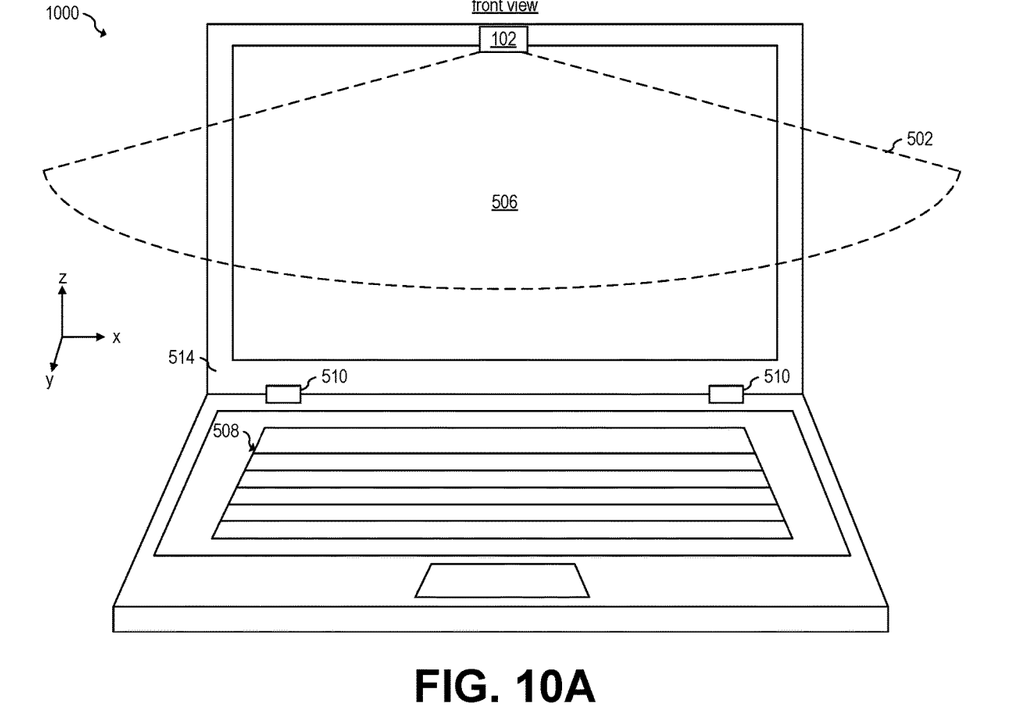
FIGS. 10A and 10B illustrate various views of a laptop, according to an embodiment of the present invention.
Figure 10B:
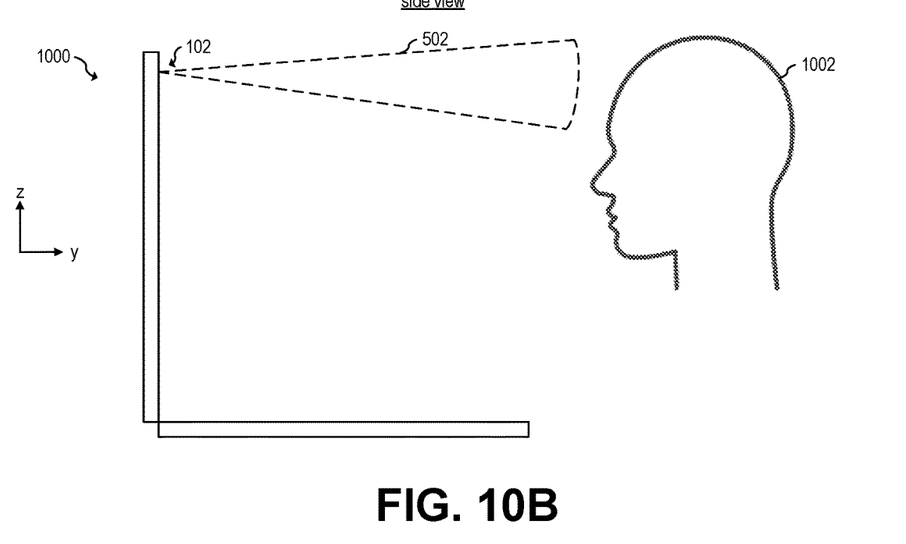

FIGS. 10A and 10B illustrate various views of laptop 1000, according to an embodiment of the present invention. Laptop moo includes millimeter-wave radar system 100, display 506, bezel 514, keyboard 508, and hinges 510.

During normal operation, laptop woo may perform method 900 (e.g., using processing system 104). For example, as illustrated in FIG. 10B, head 1002 of a human may be within field of view 502. When head 1002 is within the field of view 502 (output of step 702=yes) if the location of the head is too close to display 506 (e.g., when the range from millimeter-wave radar sensor 102 is lower than a predetermined threshold), an action is taken (908), such as warning the user (e.g., via display 506, using a sound, and/or in another manner) that the user is too close to display 506 (e.g., which may be harmful to the human eyes). In some embodiments, the brightness of display 506 may be automatically reduced when the target (e.g., hear 1002) is too close to display 506 (such brightness may automatically return to the default brightness once the target is no longer too close to display 506).

Example embodiments of the present invention are summarized here. Other embodiments can also be understood from the entirety of the specification and the claims filed herein.

Example 1. A method including: receiving a range-Doppler image (RDI) based on raw data from a radar sensor; performing moving target indication (MTI) filtering on the RDI to generate a first filtered radar image; performing constant false alarm rate (CFAR) detection on the first filtered radar image to generate a second filtered radar image; performing minimum variance distortionless response (MVDR) beamforming on the second filtered radar image to generate a range-angle image (RAI); performing CFAR detection on the RAI to generate a third filtered radar image; generating a point set based on the third filtered radar image; clustering targets of the point set; and tracking at least one of the clustered targets using a Kalman filter.

Example 2. The method of example 1, where each point of the point set includes a signal strength component and a Doppler component.

Example 3. The method of one of examples 1 or 2, where each point of the point set includes Cartesian coordinates.

Example 4. The method of one of examples 1 to 3, where cluster the targets includes clustering the targets based on the Cartesian coordinates of each point of the point set.

Example 5. The method of one of examples 1 to 4, where each point of the point set includes Polar coordinates.

Example 6. The method of one of examples 1 to 5, further including: transmitting radar signals using the radar sensor; receiving reflected radar signals using the radar sensor; generating the raw data based on the reflected radar signals; and generating the range-Doppler image based on the raw data.

Example 7. The method of one of examples 1 to 6, where generating the range-Doppler image includes performing a range fast Fourier transform (FFT) on the raw data.

Example 8. The method of one of examples 1 to 7, where the radar sensor includes two receiving antennas.

Example 9. The method of one of examples 1 to 8, where the radar sensor includes more than two receiving antennas.

Example 10. The method of one of examples 1 to 9, further including: radiating power with a first intensity using a transmitter of a communication device; and when a first target of the tracked clustered targets is detected within a predetermined distance from the transmitter of the communication device, reducing the radiated power from the first intensity to a second intensity lower than the first intensity.

Example 11. The method of one of examples 1 to 10, where the radar sensor and the transmitter of the communication device are collocated in the same location.

Example 12. The method of one of examples 1 to 11, where a field of view of the radar sensor and a field of view of the transmitter of the communication device have a substantially identical angle.

Example 13. The method of one of examples 1 to 12, where a field of view of the radar sensor covers the transmitter of the communication device.

Example 14. The method of one of examples 1 to 13, where the communication device operates according to the 5G NR communication standard.

Example 15. The method of one of examples 1 to 14, where the transmitter of the communication device is located adjacent to a keyboard of a laptop, and where the radar sensor is located in a bezel of a display of the laptop.

Example 16. The method of one of examples 1 to 15, further including: projecting a button into a first surface; and when a first target of the tracked clustered targets is detected within a predetermined distance from the projected button, causing a first action to be performed.

Example 17. The method of one of examples 1 to 16, where projecting the button includes projecting the button with a projector located in a hood of a kitchen.

Example 18. The method of one of examples 1 to 17, where the radar sensor is collocated with the projector.

Example 19. The method of one of examples 1 to 18, where the radar sensor is located in the first surface.

Example 20. The method of one of examples 1 to 19, where the radar sensor is located in a bezel of a display, the method further including, when a first target of the tracked clustered targets is detected within a predetermined distance from the display, issue a flag indicative of a user being too close to the display.

Example 21. The method of one of examples 1 to 20, where a first target of the tracked clustered targets corresponds to a center of a hand of a human.

Example 22. A millimeter-wave radar system including: a millimeter-wave radar sensor configured to transmit radar signals and receive reflected radar signals; and a processing system configured to: generate a range-Doppler image (RDI) based on the reflected radar signals, perform moving target indication (MTI) filtering on the RDI to generate a first filtered radar image, perform constant false alarm rate (CFAR) detection on the first filtered radar image to generate a second filtered radar image, perform minimum variance distortionless response (MVDR) beamforming on the second filtered radar image to generate a range-angle image (RAI), perform CFAR detection on the RAI to generate a third filtered radar image, generate a point set based on the third filtered radar image, cluster targets of the point set, and track at least one of the clustered targets using a Kalman filter.

Example 23. A device including: a millimeter-wave radar sensor configured to transmit radar signals and receive reflected radar signals; a communication device including a transmitter configured to radiate power with a first intensity; and a processing system configured to: generate a range-Doppler image (RDI) based on the reflected radar signals, perform moving target indication (MTI) filtering on the RDI to generate a first filtered radar image, perform constant false alarm rate (CFAR) detection on the first filtered radar image to generate a second filtered radar image, perform minimum variance distortionless response (MVDR) beamforming on the second filtered radar image to generate a range-angle image (RAI), perform CFAR detection on the RAI to generate a third filtered radar image, generate a point set based on the third filtered radar image, cluster targets of the point set, track at least one of the clustered targets, and when a first target of the tracked clustered targets is detected within a predetermined distance from the transmitter of the communication device, cause a reduction of the radiated power from the first intensity to a second intensity lower than the first intensity.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
receiving a range-Doppler image (RDI) based on raw data from a radar sensor;
performing moving target indication (MTI) filtering on the RDI to generate a first filtered radar image;
performing constant false alarm rate (CFAR) detection on the first filtered radar image to generate a second filtered radar image;
performing minimum variance distortionless response (MVDR) beamforming on the second filtered radar image to generate a range-angle image (RAI);
performing CFAR detection on the RAI to generate a third filtered radar image;
generating a point set based on the third filtered radar image;
clustering targets of the point set; and
tracking at least one of the clustered targets using a Kalman filter.

2. The method of claim 1, wherein each point of the point set comprises a signal strength component and a Doppler component.

3. The method of claim 2, wherein each point of the point set comprises Cartesian coordinates.

4. The method of claim 3, wherein clustering the targets comprises clustering the targets based on the Cartesian coordinates of each point of the point set.

5. The method of claim 2, wherein each point of the point set comprises Polar coordinates.

6. The method of claim 1, further comprising:
transmitting radar signals using the radar sensor;
receiving reflected radar signals using the radar sensor;
generating the raw data based on the reflected radar signals; and
generating the range-Doppler image based on the raw data.

7. The method of claim 6, wherein generating the range-Doppler image comprises performing a range fast Fourier transform (FFT) on the raw data.

8. The method of claim 1, wherein the radar sensor comprises two receiving antennas.

9. The method of claim 1, wherein the radar sensor comprises more than two receiving antennas.

10. The method of claim 1, further comprising:
radiating power with a first intensity using a transmitter of a communication device; and
when a first target of the tracked clustered targets is detected within a predetermined distance from the transmitter of the communication device, reducing the radiated power from the first intensity to a second intensity lower than the first intensity.

11. The method of claim 10, wherein the radar sensor and the transmitter of the communication device are collocated in a same location.

12. The method of claim 11, wherein a field of view of the radar sensor and a field of view of the transmitter of the communication device have a substantially identical angle.

13. The method of claim 10, wherein a field of view of the radar sensor covers the transmitter of the communication device.

14. The method of claim 10, wherein the communication device operates according to a 5G NR communication standard.

15. The method of claim 10, wherein the transmitter of the communication device is located adjacent to a keyboard of a laptop, and wherein the radar sensor is located in a bezel of a display of the laptop.

16. The method of claim 1, further comprising:
projecting a button into a first surface; and
when a first target of the tracked clustered targets is detected within a predetermined distance from the projected button, causing a first action to be performed.

17. The method of claim 16, wherein projecting the button comprises projecting the button with a projector located in a hood of a kitchen.

18. The method of claim 17, wherein the radar sensor is collocated with the projector.

19. The method of claim 17, wherein the radar sensor is located in the first surface.

20. The method of claim 1, wherein the radar sensor is located in a bezel of a display, and the method further comprises, when a first target of the tracked clustered targets is detected within a predetermined distance from the display, issuing a flag indicative of a user being too close to the display.

21. The method of claim 1, wherein a first target of the tracked clustered targets corresponds to a center of a hand of a human.

22. A millimeter-wave radar system comprising:
a millimeter-wave radar sensor configured to transmit radar signals and receive reflected radar signals; and
a processing system configured to:
generate a range-Doppler image (RDI) based on the reflected radar signals,
perform moving target indication (MTI) filtering on the RDI to generate a first filtered radar image,
perform constant false alarm rate (CFAR) detection on the first filtered radar image to generate a second filtered radar image,
perform minimum variance distortionless response (MVDR) beamforming on the second filtered radar image to generate a range-angle image (RAI),
perform CFAR detection on the RAI to generate a third filtered radar image,
generate a point set based on the third filtered radar image,
cluster targets of the point set, and
track at least one of the clustered targets using a Kalman filter.

23. A device comprising:
a millimeter-wave radar sensor configured to transmit radar signals and receive reflected radar signals;
a communication device comprising a transmitter configured to radiate power with a first intensity; and
a processing system configured to:
generate a range-Doppler image (RDI) based on the reflected radar signals,
perform moving target indication (MTI) filtering on the RDI to generate a first filtered radar image,
perform constant false alarm rate (CFAR) detection on the first filtered radar image to generate a second filtered radar image,
perform minimum variance distortionless response (MVDR) beamforming on the second filtered radar image to generate a range-angle image (RAI),
perform CFAR detection on the RAI to generate a third filtered radar image,
generate a point set based on the third filtered radar image,
cluster targets of the point set,
track at least one of the clustered targets, and
when a first target of the tracked clustered targets is detected within a predetermined distance from the transmitter of the communication device, cause a reduction of the radiated power from the first intensity to a second intensity lower than the first intensity.

* * * * *